US012584537B2

(12) United States Patent
Thompson

(10) Patent No.: US 12,584,537 B2
(45) Date of Patent: Mar. 24, 2026

(54) CUSTOM FASTENED LOCKING STOPPING COVERED WIRE ROPE CLIP SYSTEM

(71) Applicant: Theodore James Thompson, San Diego, CA (US)

(72) Inventor: Theodore James Thompson, San Diego, CA (US)

( * ) Notice: Subject to any disclaimer, the term of this patent is extended or adjusted under 35 U.S.C. 154(b) by 0 days.

(21) Appl. No.: 19/054,755

(22) Filed: Feb. 14, 2025

(65) Prior Publication Data

US 2025/0257788 A1     Aug. 14, 2025

Related U.S. Application Data

(60) Provisional application No. 63/553,554, filed on Feb. 14, 2024.

(51) Int. Cl.
*F16G 11/06*          (2006.01)

(52) U.S. Cl.
CPC ........... *F16G 11/06* (2013.01); *Y10T 24/3958* (2015.01)

(58) Field of Classification Search
CPC .......... F16G 11/06; F16G 11/04; F16G 11/02; F16G 11/044; F16G 11/048; Y10T 24/3964; Y10T 24/3958; Y10T 403/7171; Y10T 24/1437; H02G 7/056
See application file for complete search history.

(56) References Cited

U.S. PATENT DOCUMENTS

| | | | | |
|---|---|---|---|---|
| 1,582,340 A | * | 4/1926 | Milne | F16G 11/06 |
| | | | | 269/221 |
| 1,584,848 A | | 5/1926 | Clowes | |

| | | | | |
|---|---|---|---|---|
| 1,592,615 A | * | 7/1926 | Neveau | F16G 11/06 |
| | | | | 24/135 L |
| 1,604,369 A | * | 10/1926 | Spencer | F16G 11/06 |
| | | | | 24/135 R |
| 1,940,263 A | * | 12/1933 | Mclaughlin | F16G 11/06 |
| | | | | 24/135 L |
| 2,031,235 A | | 2/1936 | Taylor | |
| 2,137,834 A | * | 11/1938 | Dibner | H01R 4/32 |
| | | | | 403/399 |

(Continued)

FOREIGN PATENT DOCUMENTS

WO    WO-2020091754 A1 *  5/2020 ............. H02G 7/053

OTHER PUBLICATIONS

International Search Report and Written Opinion mailed Apr. 17, 2025 in International Application No. PCT/US2025/016139, 13 pages.

*Primary Examiner* — Jason W San
*Assistant Examiner* — Rowland Do
(74) *Attorney, Agent, or Firm* — Procopio, Cory, Hargreaves & Savitch LLP

(57)          ABSTRACT

A wire rope clip to clip strands of wire rope together includes a one piece U bolt including a pair of threaded members; a saddle including a pair of holes that receive the pair of threaded members of the U bolt to compress the strands of wire rope between the U bolt and the saddle; a pair of fasteners threadably engageable with the threaded members of the U bolt, wherein the U bolt and the saddle include respective stop engagement members that engage when the pair of threaded fasteners threadably engage the threaded members of the U bolt to a predetermined point, creating even pressure by both the one piece U bolt and the saddle on the wire rope clip and proper torque to the wire rope strands.

19 Claims, 14 Drawing Sheets

(56) References Cited

U.S. PATENT DOCUMENTS

| | | | | | |
|---|---|---|---|---|---|
| 2,199,370 | A | | 4/1940 | Card | |
| 2,643,425 | A | * | 6/1953 | Jenne | F16G 11/06 |
| | | | | | 403/209 |
| 2,884,476 | A | * | 4/1959 | Lock | F16G 11/06 |
| | | | | | 174/79 |
| 2,946,108 | A | * | 7/1960 | Bethea | F16G 11/06 |
| | | | | | 24/135 L |
| 3,058,185 | A | * | 10/1962 | Clayton | F16G 11/06 |
| | | | | | 403/395 |
| 3,058,386 | A | * | 10/1962 | Morrow | F16B 9/056 |
| | | | | | 403/368 |
| 3,115,688 | A | * | 12/1963 | Smith | F16G 11/06 |
| | | | | | 24/135 L |
| 3,470,528 | A | * | 9/1969 | Flynn | H02G 7/056 |
| | | | | | 24/115 R |
| 3,589,707 | A | | 6/1971 | Becker et al. | |
| 3,919,747 | A | * | 11/1975 | Offterdinger | F01N 13/185 |
| | | | | | 285/199 |
| 4,383,668 | A | * | 5/1983 | Hall | F16G 11/06 |
| | | | | | 174/42 |
| 4,458,976 | A | * | 7/1984 | Hudson | H01R 4/46 |
| | | | | | 439/785 |
| 4,719,672 | A | * | 1/1988 | Apperson | G02B 6/48 |
| | | | | | 24/135 R |
| 5,279,407 | A | * | 1/1994 | Shobak | B65G 33/265 |
| | | | | | 198/677 |
| 5,427,469 | A | * | 6/1995 | Galarnyk | F16G 11/06 |
| | | | | | 403/312 |
| 6,076,797 | A | * | 6/2000 | Schnautz | B29C 45/7312 |
| | | | | | 249/141 |
| 6,454,232 | B1 | * | 9/2002 | Roth | F16B 7/0433 |
| | | | | | 248/229.24 |
| 7,331,745 | B2 | * | 2/2008 | Giehl | F16B 37/0864 |
| | | | | | 411/433 |
| 8,540,471 | B2 | * | 9/2013 | Dvorak | F16B 37/0857 |
| | | | | | 411/433 |
| 9,239,073 | B2 | * | 1/2016 | Taneichi | F16B 39/282 |
| 9,263,871 | B2 | * | 2/2016 | Diop | F16B 2/065 |
| 11,677,228 | B2 | * | 6/2023 | Palmer | H02G 7/053 |
| | | | | | 248/63 |
| 2003/0165355 | A1 | * | 9/2003 | Lin | F16B 35/00 |
| | | | | | 403/408.1 |
| 2013/0011215 | A1 | * | 1/2013 | Wells | F16B 23/0007 |
| | | | | | 411/548 |
| 2013/0140111 | A1 | | 6/2013 | Desai | |

* cited by examiner

1100

1104

1102

1202

1200

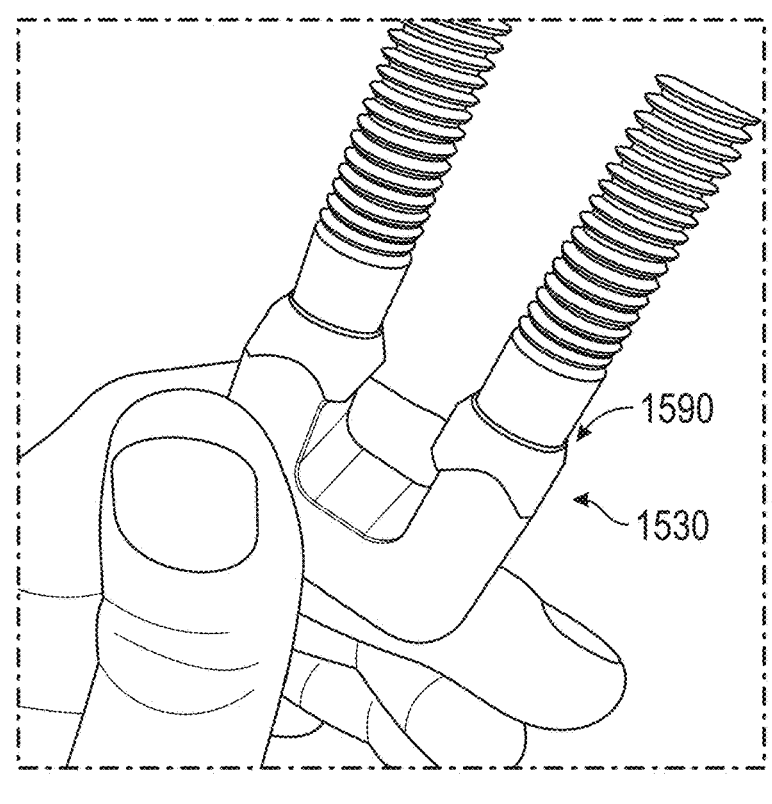
1590
1530
FIG. 20
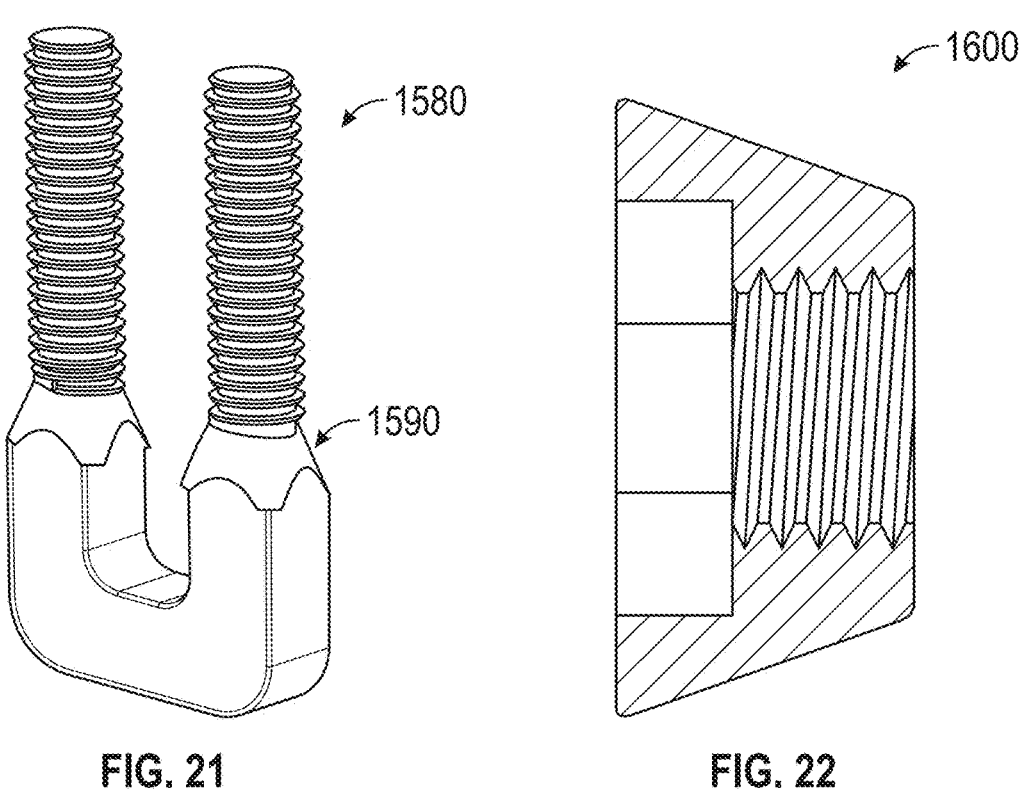
1580
1590
1600
FIG. 21                      FIG. 22

CUSTOM FASTENED LOCKING STOPPING COVERED WIRE ROPE CLIP SYSTEM

FIELD OF THE INVENTION

The present invention generally relates to wire-rope/cable clips.

BACKGROUND OF THE INVENTION

Current cable clips are subject to a number of problems. They are susceptible to unqualified personnel tampering with the wire clip, loosening the properly secured and tensioned wire rope and creating a dangerous and/or fatal fall hazard on the job.

As shown in FIGS. 1-3, the currently used cable clips consist of four parts: a "U" shaped bolt threaded on both sides, a wire rope saddle, and two tightening nuts which are completely exposed. Any person with a crescent wrench, correct size six sided socket, or locking hand grips can easily loosen the wire clip thus creating slippage of the wire rope in which it loses proper tension. Tension is set by the qualified installers by a pulling apparatus called a "come a long" that takes out the sag of the wire rope cable which is set at a certain height and tension prior to tightening of the three wire rope clips. Once the cable clips are tightened to proper torque it creates a barrier between the workers and an open hole. At height of 42" for the top rail, a top and bottom cable creates a tie off point and a fall prevention system to prevent people from falling off the edge of the building or other openings within the building. Even if the wire rope clips are retightened after someone removes tension, there will still be a dangerous "sag" to the wire rope where the height is significantly low and the wire rope will be loose to the touch causing instability. If someone loosens the clips creating a loss of tension and a "sag" the wire rope it will end up somewhere close to waist height. Also, since it is used as a tie off point and the wire rope clips are loose and someone falls in the hole there is a good chance that the wire rope clips will not hold, creating a slip in the cable. It is very possible and has happened, someone tying off to a loose wire rope or grabbing an unknowingly un-tensioned wire rope could fall over the edge to serious injury or most likely death.

Thus, problems with prior art cable clips include:

1. The current wire rope clips nuts/fasteners are exposed for anyone to access and loosen or remove with common hand tools thus making it easy to loosen. Thus, loosing tension in the wire rope creating a "sag" in the wire rope and an unsafe tie off point thus creating a deadly fall hazard.

2. The overtightening and under tightening of wire rope clamp nuts/fasteners and uneven pressure on the cable by overtightening one side as opposed to the other. Overtightening will create uneven torqueing and possible fraying or weakening of the rated wire rope. The under tightening of the wire rope clips could result in slipping of the wire rope or not enough tension in the case someone is tied off to the wire rope and falls it may not hold their weight. Someone could unknowingly grab the top cable not knowing there is a sag in the wire rope and fall over the top cable. Thus, leading to serious injury or death.

3. Uneven torqueing of the fasteners can create fraying on one side of the wire rope losing strength and proper rating of cable. When there is uneven pressure on the saddle the nut/fastener with less tension will be susceptible to loosening. Thus, the loosening of the cables someone could create the slipping of the wire and someone unknowingly grab the top cable not knowing there is a sag in the wire rope and fall over the top cable and also making it an unsafe tie off point. Thus, leading to serious injury or death.

4. The nuts/fasteners are basic six sided nuts/fasteners not only exposed but easily accessible to anyone with an adjustable wrench, six sided socket, locking hand pliers or other common tools can loosen the wire clips.

5. The saddle/concave one piece unit that holds the wire rope has a smooth surface and will add to slipping of the cable rope if not at proper torque specifications.

BRIEF SUMMARY

An aspect of the present disclosure involves a wire rope clip comprising a one-piece saddle to cover the nuts/fasteners which will be covered to deny access to loosen the nuts/fasteners with common hand tools. The wire rope clip employs a tapered multiple shaped locking nut/fastener. Thus, a standard socket will not work to remove the nut/fastener. A custom socket to that is specific to the nut/fastener will need to install or remove nuts/fasteners of my invention. A special drive adapter where one end of the adapter is custom made to adapt to the socket and the other end will fit on a standard ¼", ⅜", or ½" drive rachet, impact, torque wrench and other drive tools.

The wire rope clip includes a one piece double threaded U bolt containing "ears" added to create a unique stopping system. As the nuts/fasteners are tightened they raise the saddle upwards into the cables and top of U bolt as both parts will meet thus seating both sides evenly at proper torque specifications per OSHA that the installer can visually check proper seating of the saddle to the "stops". This will prevent fraying and splits of wire rope and uneven pressure that will also cause damage to wire ropes or loosening of nuts/fastener. Thus loosening the rated capacity of the wire rope thus creating a fall hazard.

The wire rope clip includes a saddle including grooves to create grip on the surface top that touches the live end of the wire rope. The nuts/fasteners are covered by the one piece saddle. There will be a cutout on each of the sides of the one piece saddle as an extra measure of safety and inspection. The cutout will be big enough that the installer will be able to visually see if the nuts are loose and also physically feel if the nut has loosened either in the process of installation or in the re-checking/maintenance of torque at regular intervals, yet, small enough to ensure no one can get a tool around the nut for removal. There is also a small recess in the front of the saddle to allow faster installation and handling of the socket. Also, it will also allow the little extra reach when physically feeling with your fingers for a loose nut/fastener upon installation or regular re-checking of torque throughout the job.

The wire rope clip will help prevent accidents and fatalities in the construction industry and be one more tool for contractors that will ensure the men go home to their families the same way they arrived at the jobsite.

Another aspect of the disclosure involves a wire rope clip to clip strands of wire rope together comprising a one piece U bolt including a pair of threaded members; a saddle including a pair of holes that receive the pair of threaded members of the U bolt to compress the strands of wire rope between the U bolt and the saddle; a pair of fasteners threadably engageable with the threaded members of the U bolt, wherein the U bolt and the saddle include respective stop engagement members that engage when the pair of threaded fasteners threadably engage the threaded members of the U bolt to a predetermined point, creating even pressure by both the one piece U bolt and the saddle on the wire rope clip and proper torque to the wire rope strands.

One or more implementations of the immediately above aspect of the disclosure include one or more of the following: respective stop engagement members include at least one tapered portion of the U bolt and an engagement member of the saddle; the threaded members of the U bolt include threaded ends that extend out, beyond a bottom of the saddle; the threaded fasteners have a taped external configuration; the threaded fasteners include a female section configured to receive and mate with a male section of a socket; the saddle includes a pair of cavities that mate with the pair of holes; the wire rope clip includes a first configuration, where the threaded fasteners threadably engage the threaded members of the U bolt with the threaded fasteners extending outside of the cavities, and a second configuration, when the threaded fasteners threadably engage the threaded members of the U bolt to the predetermined point, where the threaded fasteners threadably engage the threaded members of the U bolt with the threaded fasteners extending completely inside the cavities; the threaded fasteners are configured to be tightened using a custom socket, an adapter, and a drive tool; a wire rope system comprising a live end of a wire rope and a dead end of a wire; the wire rope clip of the immediately above aspect of the disclosure, wherein the U bolt and the saddle include respective stop engagement members that engage when the pair of threaded fasteners threadably engage the threaded members of the U bolt to a predetermined point, creating even pressure by both the one piece U bolt and the saddle on the live end of the wire report and the dead end of the wire rope and proper torque to the wire rope strands; a method of using the wire rope clip of the immediately above aspect of the disclosure comprising with the saddle and the U bolt coupled together inserting the wire rope strands together between the U bolt and the saddle; compressing the strands of wire rope between the U bolt and the saddle until the respective stop engagement members engage when the pair of threaded fasteners threadably engage the threaded members of the U bolt to a predetermined point, creating even pressure by both the one piece U bolt and the saddle on the wire rope clip and proper torque to the wire rope strands; the saddle includes a pair of cavities that mate with the pair of holes, and the method further comprising in a first configuration, the threaded fasteners threadably engaging the threaded members of the U bolt with the threaded fasteners extending outside of the cavities, and in a second configuration, when the threaded fasteners threadably engage the threaded members of the U bolt to the predetermined point, where the threaded fasteners threadably engage the threaded members of the U bolt with the threaded fasteners extending completely inside the cavities; a method of field installation of the wire rope clip comprising passing an end of the wire rope through the wire rope clip of the immediately above aspect of the disclosure, over the saddle; wrapping the wire rope around a weight rated secured object; passing a dead end of the wire rope back through the wire rope clips on top of the wire rope previously passed with a live end of the wire rope under the top of the one piece U bolt; using a pulling apparatus, hooked up from the end of the dead end to the live end of the wire rope and as it cranks it takes out slack of the wire rope; once tensioned, compressing the strands of wire rope between the U bolt and the saddle until the respective stop engagement members engage when the pair of threaded fasteners threadably engage the threaded members of the U bolt to a predetermined point, creating even pressure by both the one piece U bolt and the saddle on the wire rope clip and proper torque to the wire rope strands; and/or the threaded fasteners are tightened using a drive tool, adapter, and custom socket that has a custom mating fit with a female section of the threaded fasteners.

BRIEF DESCRIPTION OF THE DRAWINGS

In order to describe the manner in which the present disclosure can be implemented, a more particular description will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which:

FIG. 20 is a perspective view of an embodiment of a U bolt of the wire rope clip of FIG. 17.

FIG. 21 is a perspective view of another embodiment of a U bolt.

FIG. 22 is a cross-sectional view of an embodiment of a nut/fastener of the wire rope clip of FIG. 17.

DETAILED DESCRIPTION

In this disclosure, as illustrated in FIGS. 1-22, specific terminology is employed for the sake of clarity. The invention as claimed in this application, however, is not intended to be limited to specific terminology so selected, and it is to be understood that each specific element includes all technical equivalents that operate in a similar manner to accomplish similar functions.

Reference will now be made to the figures to describe various aspects of example embodiments of the disclosure.

To gain a better understanding of the inventive features of the embodiments of a wire rope clip of the present disclosure, with reference to FIGS. 1-3 a prior art wire rope clip will first be described.

Figure 1:
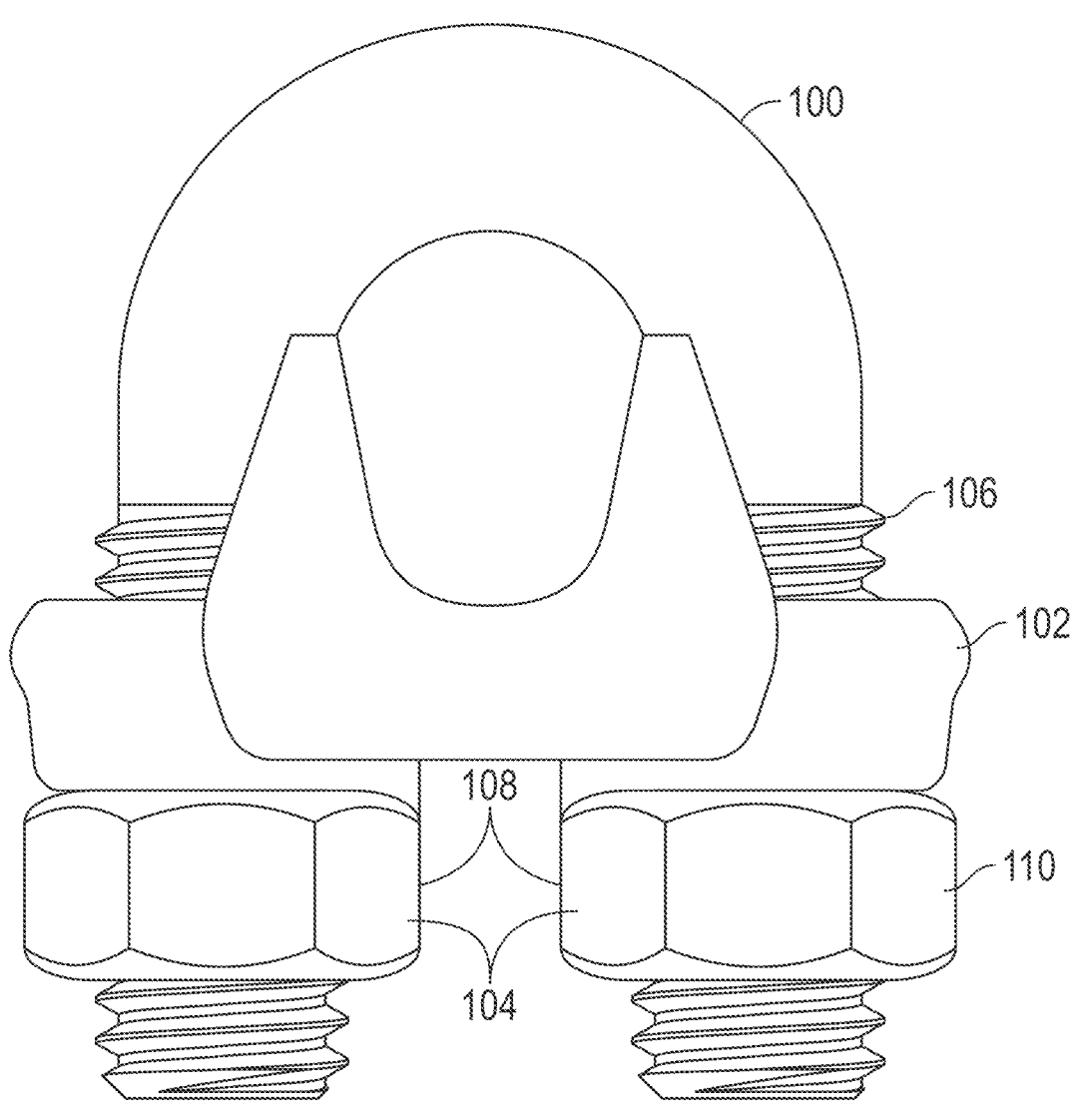
FIG. 1 is a front elevational view of a prior art wire rope clip.

FIG. 1 illustrates a prior art wire rope clip including a one-piece U bolt 100 threaded on both sides, a one-piece saddle 102, and two six-sided nuts/fasteners 104. A problem with this wire rope clip includes threads 106, which extend above saddle 102. There is nothing to stop one from over torqueing the nuts 104 or ensuring that even pressure is applied to prevent fraying or slippage. As the nut 104 tightens, pressure continues unevenly causing fraying to wire rope. The one piece saddle 102 leaves the two fasteners/ nuts 104 exposed at 108 so anyone with basic hand tools can remove them. The nuts/fasteners include six sides 110 where any standard socket, adjustable wrench, or hand locking pliers can be used to remove them.

Figure 2:
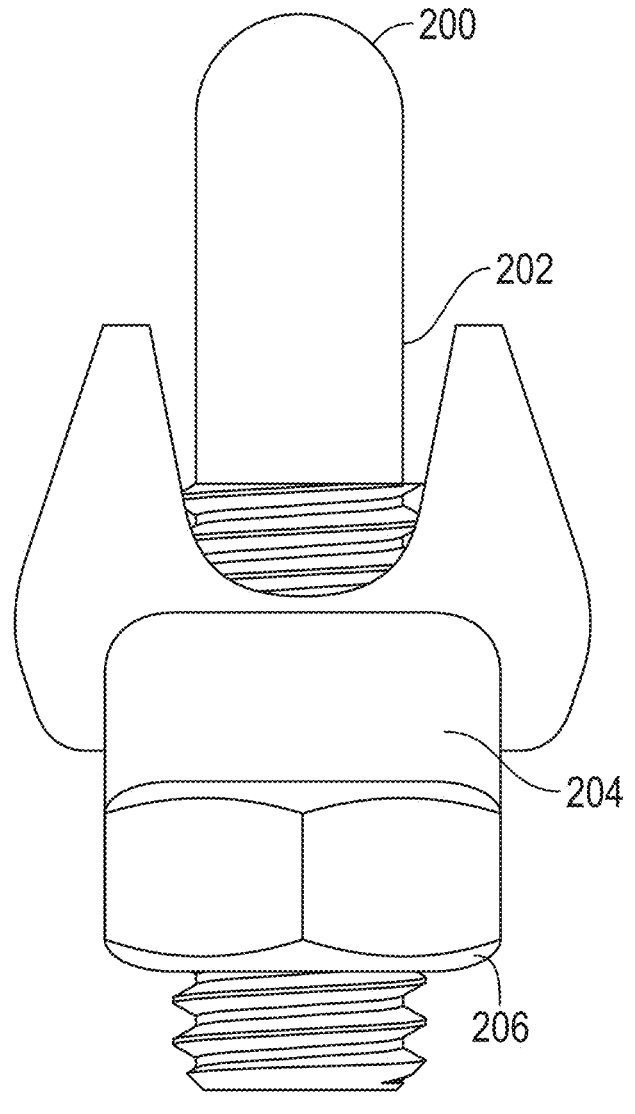
FIG. 2 is a side elevational view of the prior art wire rope clip.

FIG. 2 illustrates a side elevational view of the prior art wire rope clip of FIG. 1 and shows how the threads 106 are above the saddle 102. The threads 106 are above the saddle 102, allowing the nuts/fasteners 104 the ability to raise up past torque and unevenly. As shown at 204, the saddle 102 has the ability to freely move up and down to any height. As shown at 206, the exposed nut 104 can be taken off or loosened easily with basic hand tools.

Figure 3:
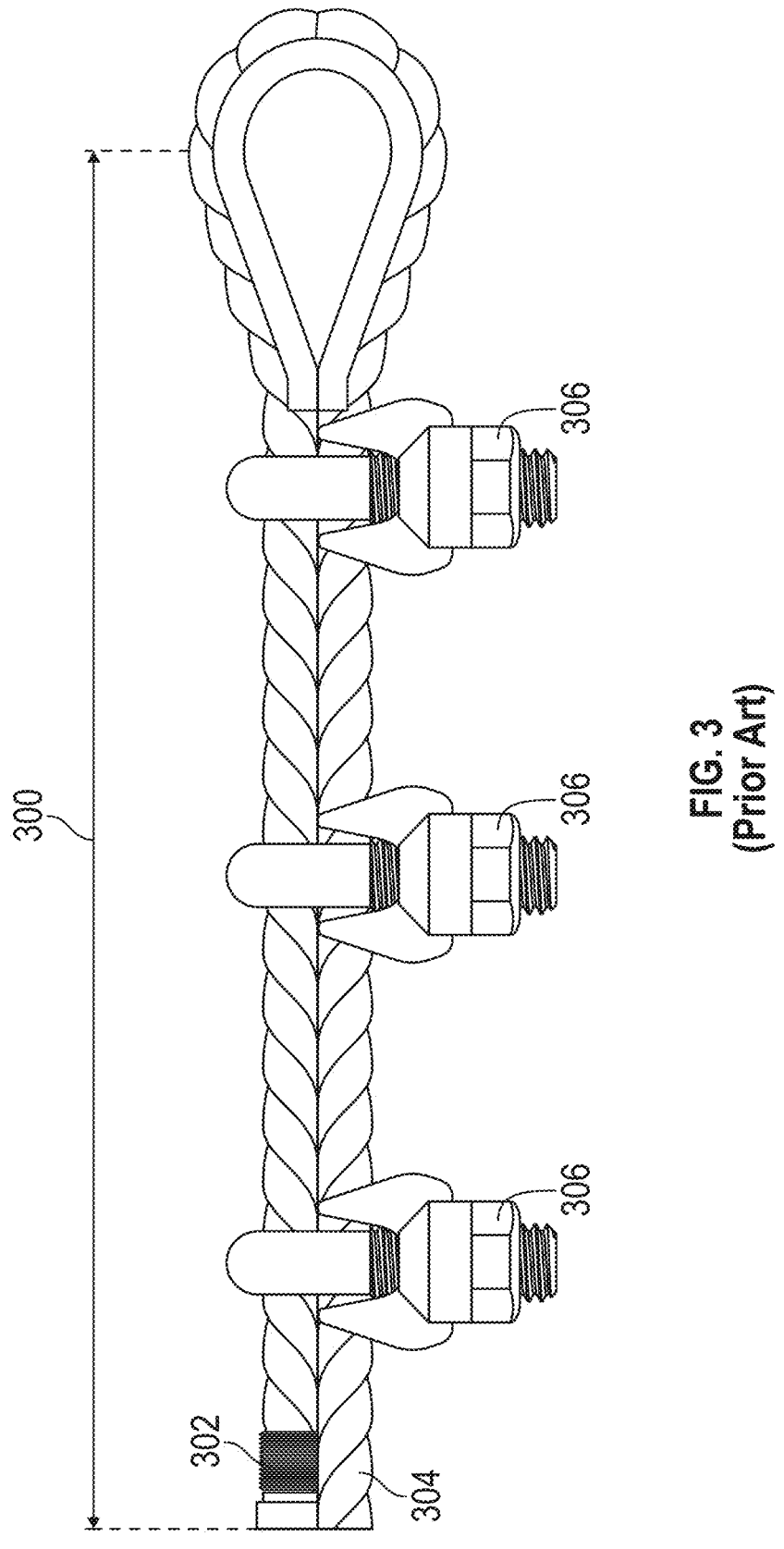
FIG. 3 is a side elevational view of a rope clip system using the prior art wire rope clip(s).

FIG. 3 is a side elevational view of a rope clip system 300, which includes the prior art wire rope clip(s), properly put together with the problems described above. The rope clip system 300 includes a "dead" end 302 of the wire or the end of the cable and a "live" end 304 of the cable which holds the pressure of the wire rope. At 306, the clamps are exposed and, if loosened, the "live" end 304 will slip because of the tension put on by the "come a long" causing the "live" end 304 to loosen, thus, creating a fall hazard.

With reference to FIGS. 4-22, and initially FIGS. 4-15, embodiment(s) of a wire rope clip 50 will be described. The wire rope clip 50 includes a one piece U bolt 400 with threads 404 on both ends. The U bolt 400 includes stops 402 that will seat to saddle 500 on both sides to ensure proper torque specifications and even force onto the cables. The installer will be able to visually see that both sides are even and seated properly. The threads 404 are on both ends of the U bolt 400 and stick out of the bottom of a cavity of saddle 500. Nuts/fasteners 600 are threaded onto the U bolt 400 at this point.

Figures 4, 5, 6:
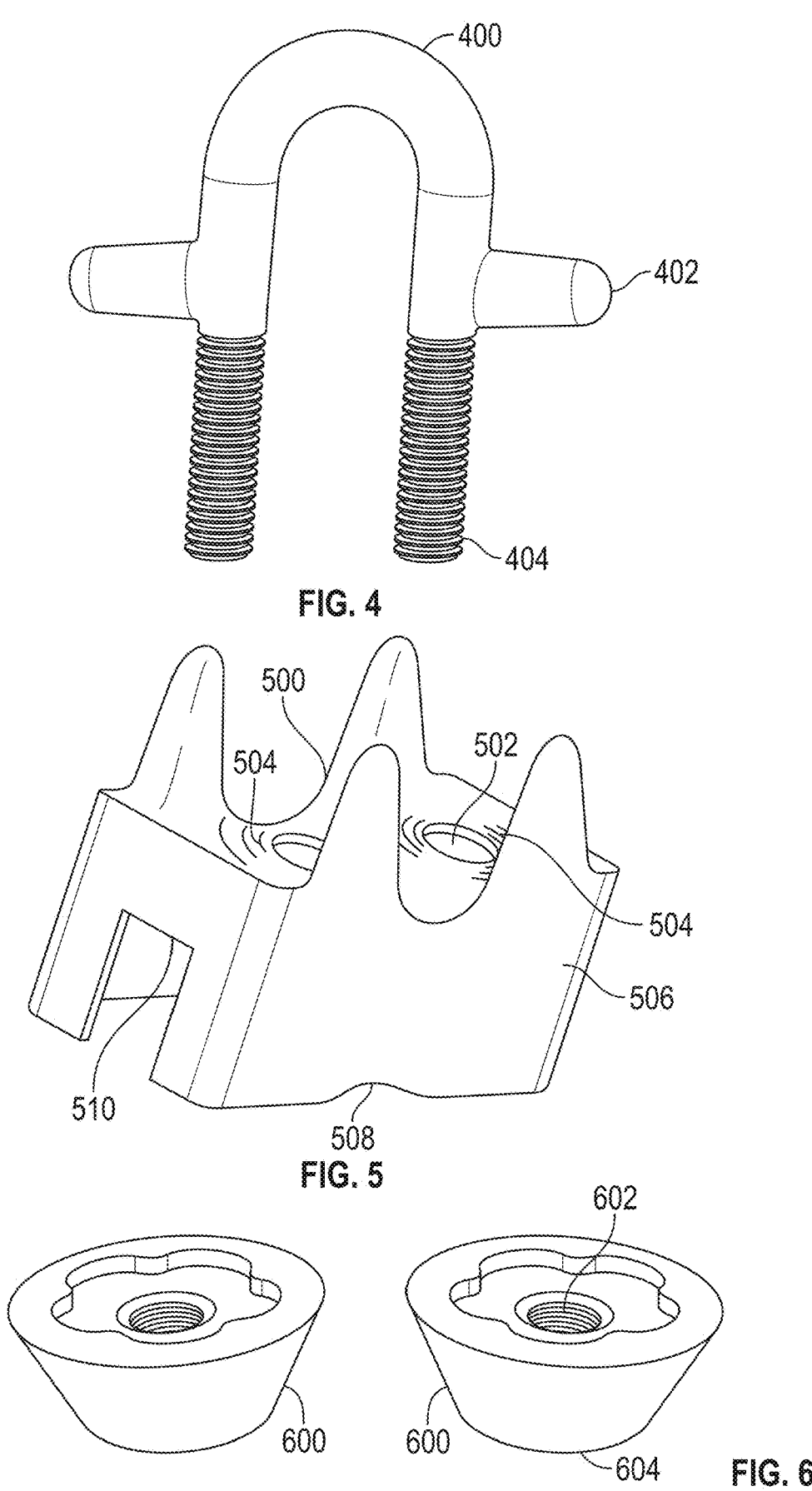
FIG. 4 is a perspective view of a U bolt of an embodiment of a wire rope clip.
FIG. 5 is a perspective view of a saddle of the embodiment of the wire rope clip.
FIG. 6 is a perspective view of nuts/fasteners of the embodiment of the wire rope clip.

With reference to FIG. 5, a saddle 500 is contoured to hold the wire rope. The saddle 500 includes two holes 502 through which the U bolt 400 passes through the saddle 500. Added grooves 504 create grip on the live end of the rope to help prevent slipping. The saddle 500 includes sides 506 that cover the nuts/fasteners 600 and protects them from being loosened with basic hand tools. A small recess 508 in the saddle 500 enables the wire rope clip 50 to be installed faster by giving the installer the ability to control socket 1200. It allows extra room to physically feel the nut/fastener 600 upon installation and re-checking of nuts 600 to torque specifications, and to make sure the nuts 600 have not backed off or loosened. A cutout 510 on the side of the one piece saddle 500 is typical to both ends and allows the installer to visually see the nut/fastener 600 and physically feel it with their fingers to ensure the nuts/fasteners 600 are tight upon installation and re-checking of tightness. The opening will be big enough to visually see and physical feel the nut but small enough that someone cannot put a tool around the nut/fastener 600 for removal or loosening. A stop contact/engagement member/portion 512 of the one piece saddle 500 of the wire rope clip 50 seats to the stop 402 on the one piece U-Bolt 400 to ensure proper torque and even pressure that is applied to the wire rope. It allows the installer to visually see that the saddle 500 and stop 402 have evenly seated to each other ensuring proper and even torqueing. The one piece U bolt 400 and the one piece saddle 500 will seat to each other upon tightening of the nuts/ fasteners 600 and compression of the two wire rope strands.

With reference to FIG. 6, locking nuts/fasteners 600 includes threads 602 that mate onto the threads 404 of the U Bolt 400. The locking nuts/fasteners 600 include a unique design/recess configuration 604 that the custom socket 1200 mates so that the nuts 600 can only be removed by the custom socket 1200.

Figure 7:
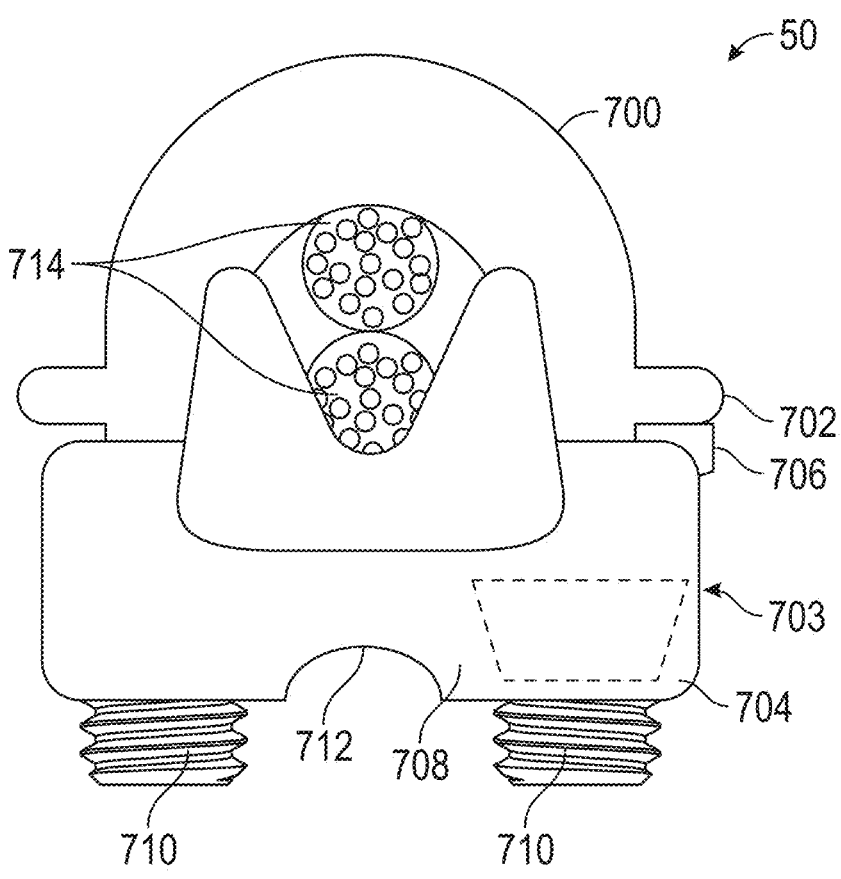
FIG. 7 is a front elevational view of the assembled wire rope clip.

With reference to FIG. 7, a front elevational view of the assembled wire rope clip 50 is shown. Although described and the description incorporated herein, the aforementioned elements are identified by different reference numbers. The one piece U Bolt 700 is shown with stops 702. The ears/ stops 702 on each side of the one piece U Bolt 700 allow the one piece saddle 703 to meet the stops 702 on the one piece U bolt, seating to each other creating proper tension and even pressure to the wire rope clip as it is fastened. The saddle 703 includes sides 704. At 706, a point at which the even seating of the stops 702 on the one piece U Bolt 700 and the one piece saddle 703 seat to each other creating proper torque and even pressure. The installer can visually inspect that the two parts have properly seated and are even. Thus, creating proper compression of the wire rope. At 708, the one piece saddle 703 is designed to cover the nuts/ fasteners 708 typical on front and back denying access to the nuts/fasteners to prevent removal or loosening with basic hand tools. The nuts/fasteners will be recessed in the cavity of the saddle. Bottoms 710 of the one piece U Bolt 700 are threaded and are the point where the nuts/fasteners are threaded onto the wire rope clip. Recess 712 in the front/ back of the saddle 703 allows for faster install of the nuts/fasteners and easier handling of the custom socket during installation and removal of the wire rope clip. It allows the installer to physically feel the nut/fastener easier ensuring the nuts/fasteners are not loose. Two strands of wire rope 714 are shown compressed evenly between the one piece saddle and the one piece U bolt to proper torque specifications and even seating of the two parts. At 604, the unique design is shown that only accepts the custom coded socket.

Figure 8:
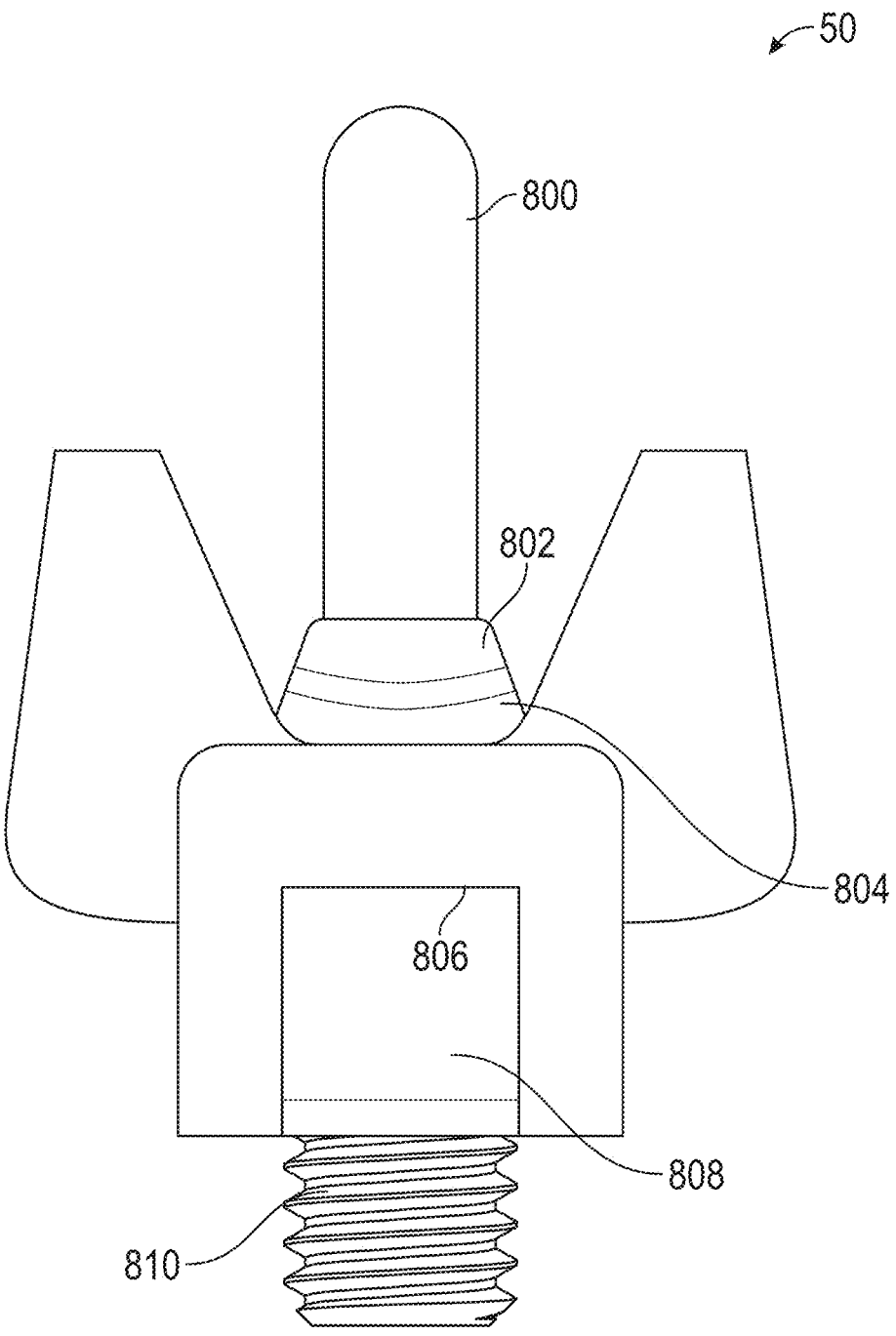
FIG. 8 is a side elevational view of the assembled wire rope clip.

With reference to FIG. 8, a side elevational view of the assembled wire rope clip 50 is shown. Although described and the description incorporated herein, the aforementioned elements are identified by different reference numbers. The U bolt includes a top 800. The stop 802 is shown on the one piece wire rope clamp where the one piece saddle seats to. Shown at 804 is the point in which the stop 802 and the top of the saddle seat evenly and at proper torque specifications. The cutout 806 on the side of the one piece saddle as the nut/fastener are still covered yet can be visually inspected and physically felt by the installer to ensure it is not loose upon installation or during re-checking of torque on scheduled intervals. The opening 808 is big enough only to see and feel the nut/fastener yet not big enough to get a tool around the nut for removal. The threads 810 on the bottom of the U bolt are where the fasteners/nuts are threaded onto.

Figure 9:
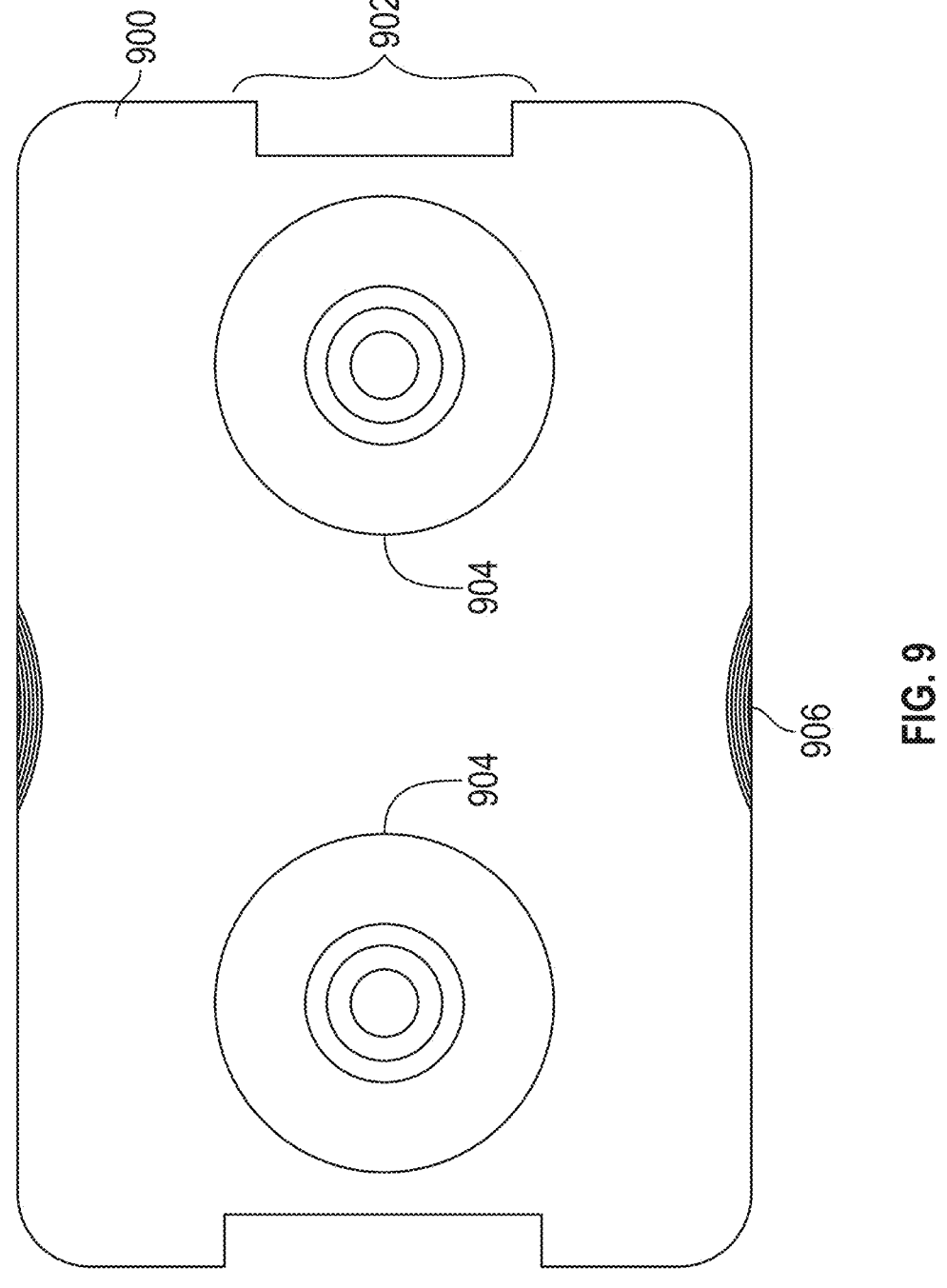
FIG. 9 is a bottom plan view of the assembled wire rope clip.

With reference to FIG. 9, a bottom plan view of the cavity opening on the bottom of the saddle is shown. Although described and the description incorporated herein, the afore-mentioned elements are identified by different reference numbers. At 900, the bottom of the saddle is shown assembled. The side opening 902 of the saddle allows one to visually see and physically feel if the nuts/fasteners are loose. The nuts/fasteners 904 are threaded onto the one piece U bolt. The recess 906 in the front/back of the saddle allows for faster install of the nuts/fasteners and easier handling of the custom socket during installation and removal of the wire rope clip. Also, it allows the installer to physically feel the nut/fastener with their fingers ensuring the nuts/fasteners are not loose.

Figure 10:
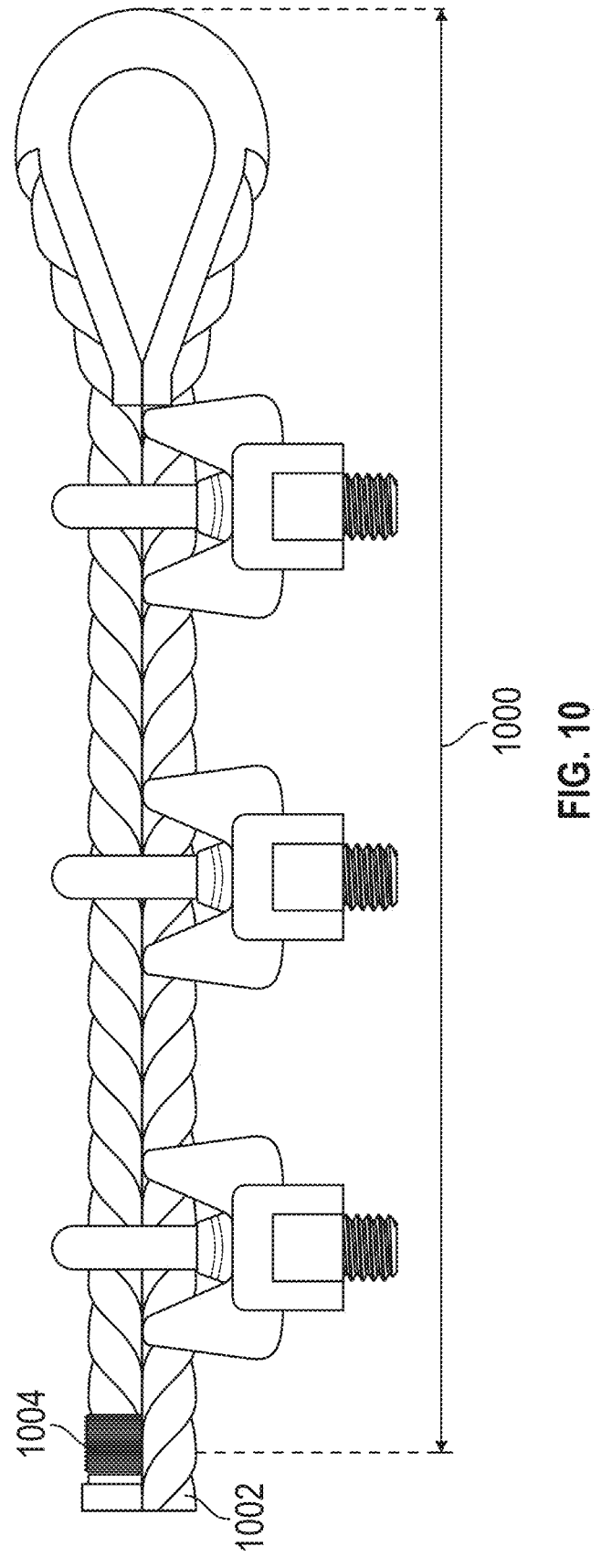
FIG. 10 is a side elevational view of a rope clip system using the wire rope clip(s).

FIG. 10 is a side elevational view of a rope clip system using the wire rope clip(s). Although described and the description incorporated herein, the aforementioned elements are identified by different reference numbers. The complete wire rope clip system 1000 is shown installed evenly spaced and to proper torque specifications. The wire rope clips are now inaccessible to anyone trying to remove the wire rope clips. They are all properly seated to the "stops" on the U Bolt and the saddle. The nuts/fasteners can still be visually and physically inspected yet covered so no one can loosen or remove them with basic hand tools. Only the custom socket can remove the nuts/fasteners to loosen or remove the wire rope clips. The side cutout will allow qualified personnel to routinely check both visually and physically if retorquing is necessary the only way is with the custom socket and drive system. The live end 1002 holds the tension of the wire rope as it is put to tension by a "come along" on the "dead end" after being wrapped around a secured rated object. It runs over the saddle portion of the wire rope clip. The dead end 1004 of the wire after being wrapped around the rated object then runs over the top of the "live end". It is between the "live end" of the cable and the one piece U Bolt.

Figure 11:
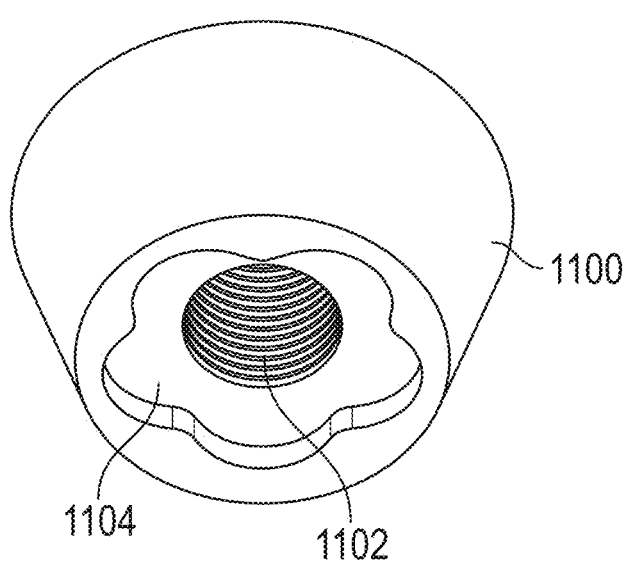
FIG. 11 is a nut/fastener of the wire rope clip.

FIG. 11 is a nut/fastener of the wire rope clip. Although described and the description incorporated herein, the afore-mentioned elements are identified by different reference numbers. The complete wire rope clip system 1000 is shown installed evenly spaced and to proper torque specifications. The nut/fastener 1100 is be tapered to prevent removal. It can only be loosened or tightened with the custom socket and adapter drive system 1200, 1400 and used with a standard drive tool 1500. The custom nut/fastener 1102 will be threaded to match the pitch of the one piece U Bolt threads. The nut fastener female side 1104 is to mate to the custom socket design 1202 of the custom socket 1200. It is uniquely designed to only fit the custom socket 1200.

Figure 12:
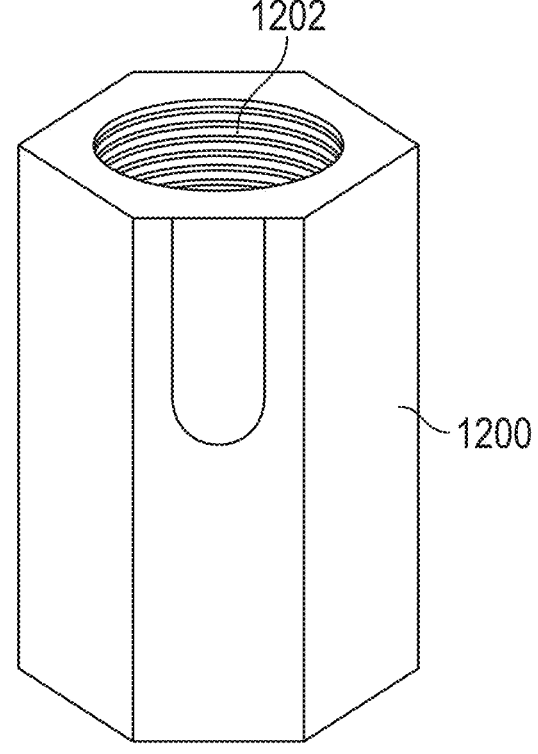
FIG. 12 is a top perspective view of custom socket for the wire rope clip.

FIG. 12 is a top perspective view of custom socket for the wire rope clip. Although described and the description incorporated herein, the aforementioned elements are iden-tified by different reference numbers. The deep socket 1200 is custom made to fit the nut/fastener 1100. The opening 1202 at the top of the socket is the custom coded male end to mate to the female end 1104 of the nuts/fasteners 1100.

Figures 13, 14:
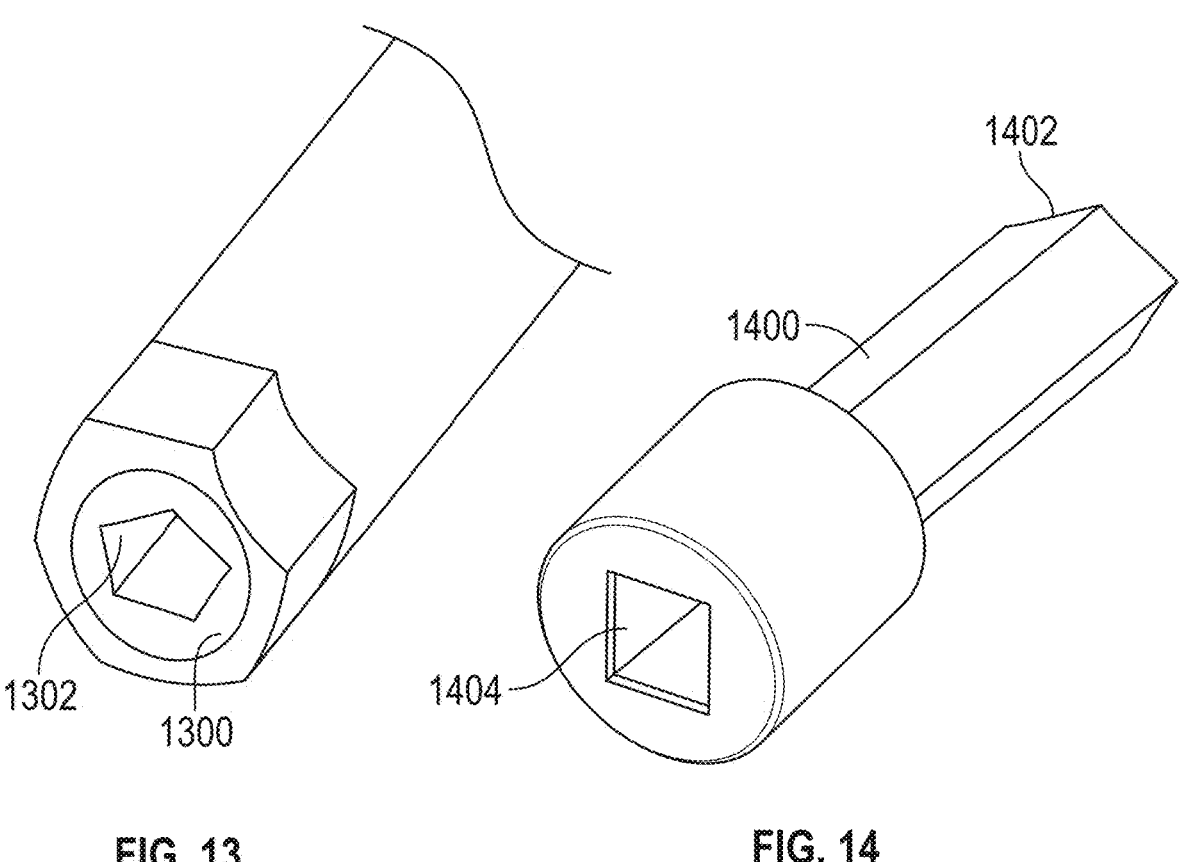
FIG. 13 is a bottom perspective view of custom socket of a fastening system for the wire rope clip.
FIG. 14 is a bottom perspective view of an adapter of the fastening system for the wire rope clip.

FIG. 13 is a bottom perspective view of custom socket of a fastening system for the wire rope clip. Although described and the description incorporated herein, the aforementioned elements are identified by different reference numbers. The custom socket 1300 will have a unique female receiving shape 1302 to allow the use of the custom adaptor 1400 to the socket 1200. In the event an unauthorized person gets a hold of the socket they will not be able to adapt it to a standard drive tool 1500 as the receiving cavity 1302 is designed to only receive the adapter male end 1402. The uniquely shaped female receiving cavity 1302 to the adapter 1400 on the bottom side of the custom made socket 1302.

FIG. 14 is a bottom perspective view of an adapter of the fastening system for the wire rope clip. Although described and the description incorporated herein, the aforementioned elements are identified by different reference numbers. The custom adapter 1400 which has one side unique to the custom drive socket 1402 mates to female receiving shape 1302 and the other side of the adapter 1404 is to receive a standard ¼', ⅜', or ½" drive tool 1500. The unique male end 1402 of the adapter fits into the receiving female end of the custom socket 1302. The bottom 1404 of the female end of the adapter receives a standard ¼", ⅜", or ½" drive tool 1500. It will work with a torque wrench for final torqueing to OSHA set specifications.

Figure 15:
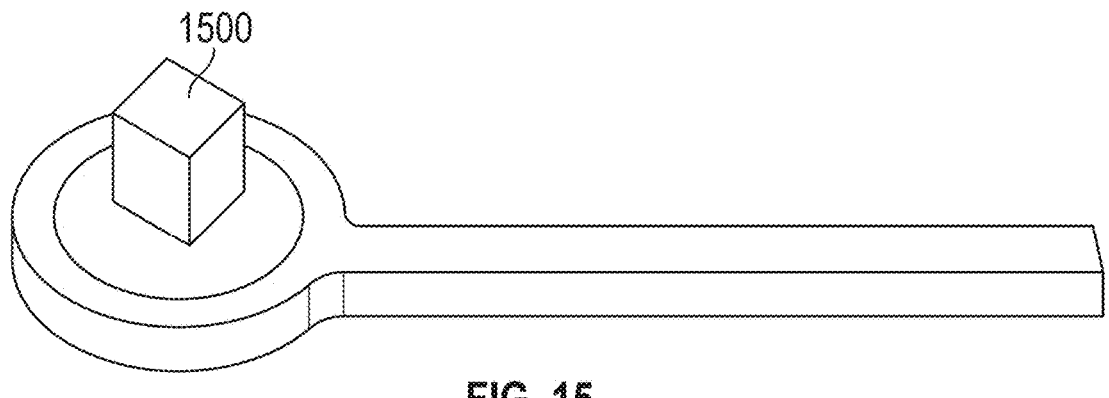
FIG. 15 is a perspective view of a standard drive tool for the fastening system for the wire rope clip.

FIG. 15 is a perspective view of a standard drive tool for the fastening system for the wire rope clip. Although described and the description incorporated herein, the afore-mentioned elements are identified by different reference numbers. The drive tools includes a male end 1500 that is inserted into the female end 1404 of the adapter 1400. It will mate to ¼", ⅜", or ½" drive tools.

Figure 16:
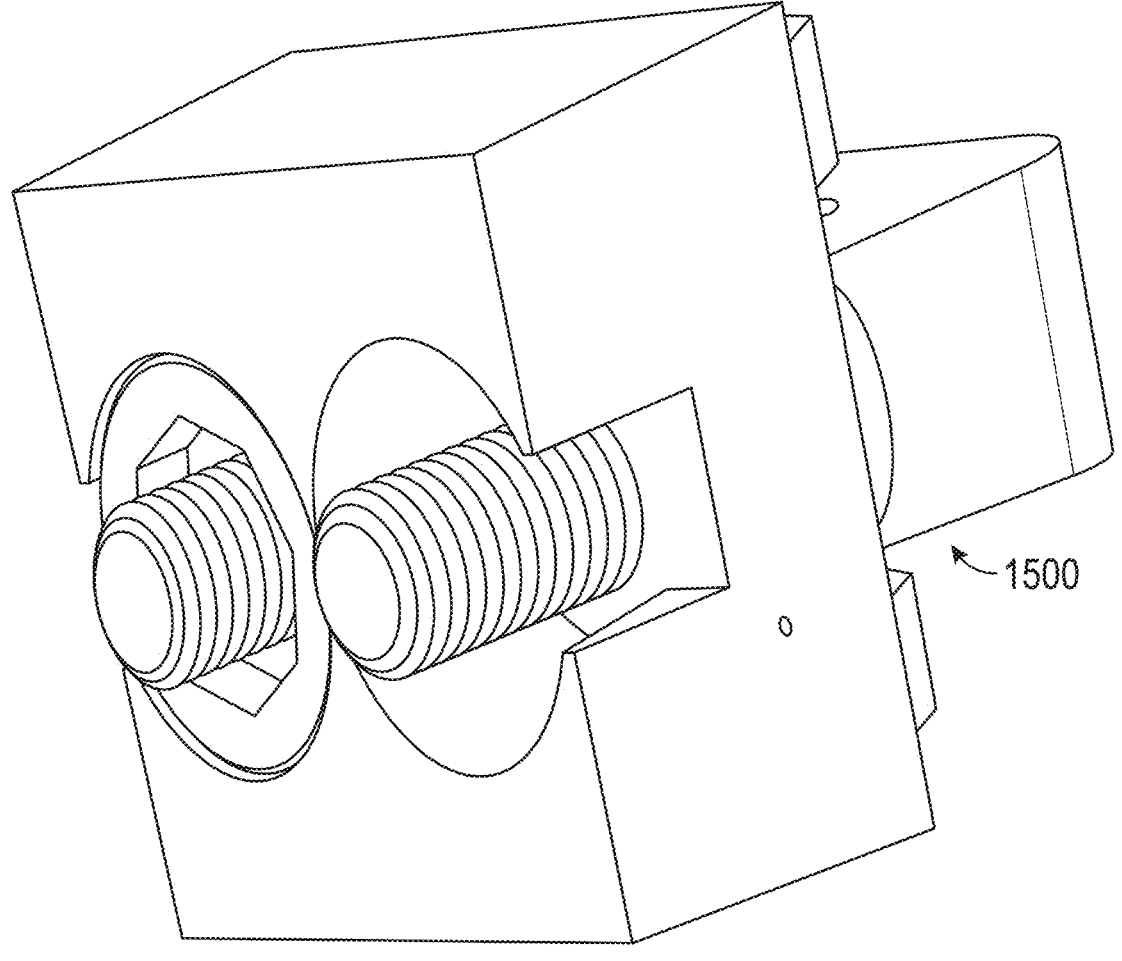
FIG. 16 is a perspective view of another embodiment of a wire rope clip.

FIG. 16 is a perspective view of another embodiment of a wire rope clip 1500.

Figure 17:
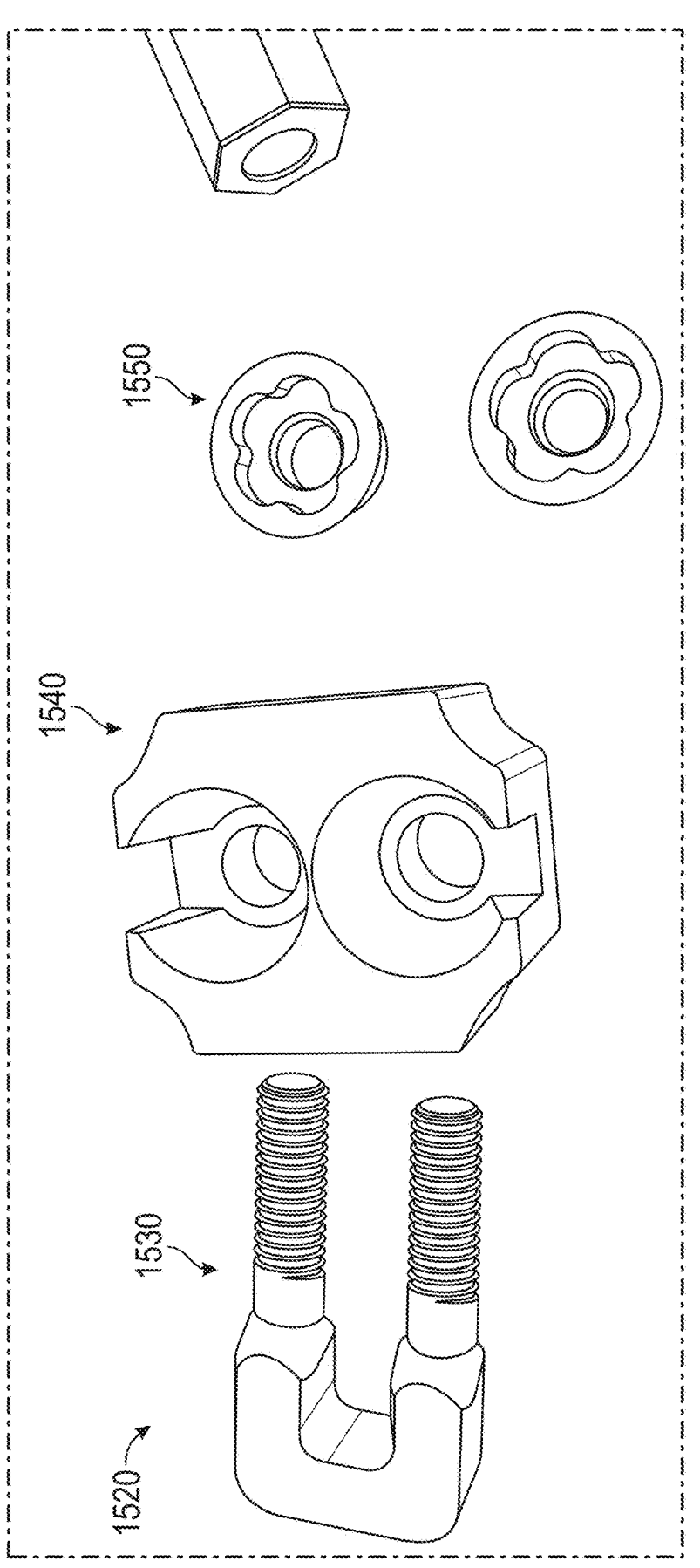
FIG. 17 is an exploded perspective view of a further embodiment of a wire rope clip.

FIG. 17 is an exploded perspective view of a further embodiment of a wire rope clip 1520. The wire rope clip 1520 includes one piece U bolt 1530, saddle 1540, and nuts/fasteners 1550 are discussed and shown above with respect to FIGS. 4-15, which is incorporated by reference herein.

Figures 18, 19:
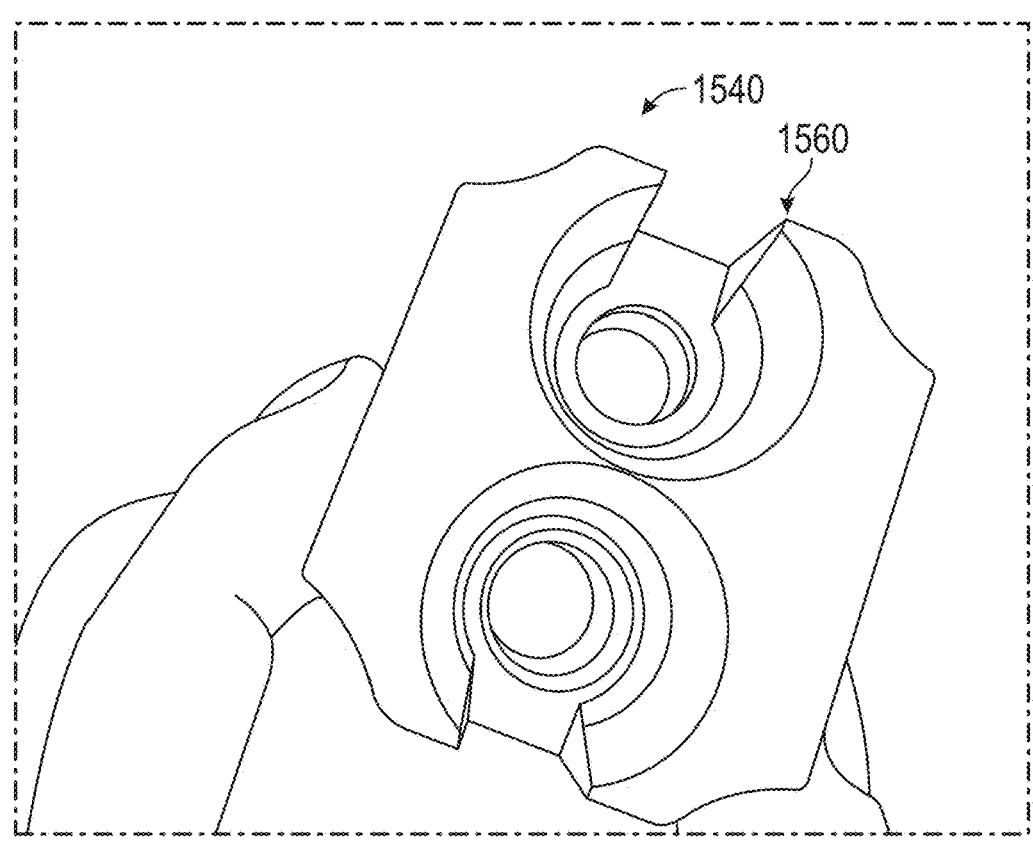
FIG. 18 is a perspective view of a saddle of the wire rope clip of FIG. 17.
FIG. 19 is another perspective view of the saddle of FIG. 18.

FIG. 18 is a perspective view of the saddle 1540 of the wire rope clip of FIG. 17 and shows tapered recesses 1560 that receive the nuts 1550 as described above.

FIG. 19 is another perspective view of the saddle 1540 of FIG. 18 and shows cutout 1570, which functions the same as the cutout 510 described above.

FIGS. 20 and 21 show embodiments of U bolts 1530, 1580. The U bolts 1530, 1580 are similar to the U bolts 400, 700 shown and described above, but instead of laterally protruding ear/stop 402, the U bolts 400, 700 include tapered section 1590 that functions as the stop at the top of the saddle 1540 similar to stop contact/engagement member/portion 512 of the one piece saddle 500 of the wire rope clip 50 seating to the stop 402 on the one piece U-Bolt 400 (and the ears/stops 702 on each side of the one piece U Bolt 700 allow the one piece saddle 703 to meet the stops 702 on the one piece U bolt) to ensure proper torque and even pressure is applied to the wire rope as described above and is incorporated by reference herein along with the features shown and/or described with respect to FIGS. 4-15.

FIG. 22 is a cross-sectional view of an embodiment of a nut/fastener 1600 of the wire rope clip of FIG. 17 functions in the same manner as the nut/fasteners shown and/or described herein, which is incorporated by reference herein.

The wire rope clip will now be described in use. The one piece U bolt 400, 1530, 1580 passes through the two holes in the saddle 500, 703, 1540 as the two threaded ends stick out of the bottom of the saddle 404, 703, 1540, the two nuts/fasteners 600, 708, 904, 1100, 1550 are threaded onto the threaded ends. The nuts/fasteners 600, 708, 904, 1100, 1550 are tightened using the custom socket 1200, adapter 1400, and drive tool 1500. The one piece saddle 500, 703, 1540 raises upwards towards the top of the one piece U bolt 400, 1530, 1580 compressing the two strands of wire rope until the saddle 500, 703, 1540 seats to the stops 402, 702,

1590 creating even pressure on both sides of the wire rope clip and proper torque to the wire rope strands 714.

Field installation of the wire rope clip/wire rope embed system 1000 will now be described. The end of the wire rope 1004 is passed through the wire rope clip over the saddle 404, 703, 1540 and then wrapped around the weight rated secured object. The end of the wire, now the dead end 1004 is passed back through the wire rope clips on top of the wire rope, now the live end 1002 and under the top of the one piece U bolt 400. A pulling apparatus is now used and is hooked up from the end of the dead end 1004 to the live end 1002 of the wire rope and as it cranks it takes out the slack of the wire rope. Once the installer is sure of proper tension, the wire rope clip nuts/fasteners 600 can be tightened using the drive tool 1500, adapter 1400, and custom socket 1200. As the nuts/fasteners 600, 708, 904, 1100, 1550 are tightened, the saddle 500, 703, 1540 raises towards the top of the U bolt 400, 1530, 1580, compressing to proper and even tension. The saddle 500, 703, 1540 will now seat to the stops 402, 702, 1590 on the one piece U bolt 400, 1530, 1580 creating proper torque and even compression to wire rope to complete the wire rope embed system 1000.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

I claim:

1. A wire rope clip to clip strands of wire rope together, comprising:

a one piece U bolt including a pair of threaded members;

a saddle including a pair of holes that receive the pair of threaded members of the U bolt to compress the strands of wire rope between the U bolt and the saddle;

a pair of fasteners threadably engageable with the threaded members of the U bolt, wherein the U bolt and the saddle include respective stop engagement members that engage when the pair of threaded fasteners threadably engage the threaded members of the U bolt to a predetermined point, creating even pressure by both the one piece U bolt and the saddle on the wire rope clip and proper torque to the wire rope strands, the stop engagement members of the U bolt being transitional portions of greater lateral outer dimension than the threaded members, wherein the saddle includes a pair of recesses that receive the pair of fasteners therein and the saddle includes opposite side walls with a pair of cutouts therein, both the cutouts and the threaded members being longitudinally and linearly aligned in the saddle, the cutouts allowing an installer to visually see the pair of fasteners within the pair of recesses, the pair of fasteners including a frustoconical exterior, and the pair of recessed cavities having a configuration that mates with the frustoconical exterior of the pair of fasteners.

2. The wire rope clip of claim 1, wherein respective stop engagement members include at least one tapered portion of the U bolt and an engagement member of the saddle.

3. The wire rope clip of claim 1, wherein the threaded members of the U bolt include threaded ends that extend out, beyond a bottom of the saddle.

4. The wire rope clip of claim 1, wherein the threaded fasteners have a tapered external configuration.

5. The wire rope clip of claim 1, wherein the threaded fasteners include a female section configured to receive and mate with a male section of a socket.

6. The wire rope clip of claim 1, wherein the saddle includes a pair of cavities that mate with the pair of holes.

7. The wire rope clip of claim 1, wherein the saddle includes a pair of recessed cavities that receive the pair of fasteners therein, the wire rope clip includes a first configuration, where the threaded fasteners threadably engage the threaded members of the U bolt with the threaded fasteners extending outside of the recessed cavities, and a second configuration, when the threaded fasteners threadably engage the threaded members of the U bolt to the predetermined point, where the threaded fasteners threadably engage the threaded members of the U bolt with the threaded fasteners extending completely inside the recessed cavities.

8. The wire rope clip of claim 1, wherein the threaded fasteners are configured to be tightened using a custom socket, an adapter, and a drive tool.

9. A wire rope system, comprising:

a live end of a wire rope and a dead end of a wire;

the wire rope clip of claim 1, wherein the transitional portions of greater lateral outer dimension of the stop engagement members of the U bolt engage the respective stop engagement members of the saddle when the pair of threaded fasteners threadably engage the threaded members of the U bolt to a predetermined point, creating even pressure by both the one piece U bolt and the saddle on the live end of the wire rope and the dead end of the wire rope and proper torque to the wire rope strands.

10. A method of using the wire rope clip of claim 1, comprising:

with the saddle and the U bolt coupled together inserting the wire rope strands together between the U bolt and the saddle;

compressing the strands of wire rope between the U bolt and the saddle until the transitional portions of greater lateral outer dimension of the stop engagement members of the U bolt engage the respective stop engagement members of the saddle when the pair of threaded fasteners threadably engage the threaded members of the U bolt to a predetermined point, creating even pressure by both the one piece U bolt and the saddle on the wire rope clip and proper torque to the wire rope strands.

11. The method of claim 10, wherein the saddle includes a pair of cavities that mate with the pair of holes, and the method further comprising:

in a first configuration, the threaded fasteners threadably engaging the threaded members of the U bolt with the threaded fasteners extending outside of the cavities, and in a second configuration, when the threaded fasteners threadably engage the threaded members of the U bolt to the predetermined point, where the threaded fasteners threadably engage the threaded members of the U bolt with the threaded fasteners extending completely inside the cavities.

12. The method of claim 10, wherein the one piece U bolt includes a C shaped section joining the threaded members and the C shaped section includes a flat engagement portion configured to engage a strand of the strands of wire, and the method further comprising:

when compressing the strands of wire rope between the U bolt and the saddle, engaging a strand of the strands of wire with the flat engagement portion of the C shaped section of the one piece U bolt.

13. A method of field installation of the wire rope clip, comprising:

passing an end of the wire rope through the wire rope clip of claim 1, over the saddle;

wrapping the wire rope around a weight rated secured object;

passing a dead end of the wire rope back through the wire rope clips on top of the wire rope previously passed with a live end of the wire rope under the top of the one piece U bolt;

using a pulling apparatus, hooked up from the end of the dead end to the live end of the wire rope and as it cranks it takes out slack of the wire rope;

once tensioned, compressing the strands of wire rope between the U bolt and the saddle until the transitional portions of greater lateral outer dimension of the stop engagement members of the U bolt engage the respective stop engagement members of the saddle when the pair of threaded fasteners threadably engage the threaded members of the U bolt to a predetermined point, creating even pressure by both the one piece U bolt and the saddle on the wire rope clip and proper torque to the wire rope strands.

14. The method of claim 13, where the threaded fasteners are tightened using a drive tool, adapter, and custom socket that has a custom mating fit with a female section of the threaded fasteners.

15. The wire rope clip of claim 1, wherein the saddle includes a pair of recessed cavities that receive the pair of fasteners therein, the pair of fasteners rotatable relative to and within the pair of recessed cavities.

16. The wire rope clip of claim 1, wherein the saddle includes a pair of recessed cavities that receive the pair of fasteners therein, the pair of fasteners including a female end with a custom coded recess configured to matingly receive a custom coded male end of a socket.

17. The wire rope clip of claim 1, wherein the stop engagement members include tapered stops.

18. The wire rope clip of claim 1, wherein the one piece U bolt includes a C shaped section joining the threaded members and the C shaped section includes a flat engagement portion configured to engage a strand of the strands of wire.

19. A wire rope clip to clip strands of wire rope together, comprising:

a one piece U bolt including a pair of threaded members;

a saddle including a pair of holes that receive the pair of threaded members of the U bolt to compress the strands of wire rope between the U bolt and the saddle;

a pair of fasteners threadably engageable with the threaded members of the U bolt, wherein the U bolt and the saddle include respective stop engagement members that engage when the pair of threaded fasteners threadably engage the threaded members of the U bolt to a predetermined point, creating even pressure by both the one piece U bolt and the saddle on the wire rope clip and proper torque to the wire rope strands, the stop engagement members of the U bolt being transitional portions of greater lateral outer dimension than the threaded members, wherein the saddle includes a pair of recessed cavities that receive the pair of fasteners therein, the pair of fasteners including a frustoconical exterior, and the pair of recessed cavities having a configuration that mates with the frustoconical exterior of the pair of fasteners.

* * * * *